United States Patent [19]
Hodges

[11] Patent Number: 5,745,671
[45] Date of Patent: Apr. 28, 1998

[54] DATA STORAGE SYSTEM WITH LOCALIZED XOR FUNCTION

[75] Inventor: Paul Hodges, San Jose, Calif.

[73] Assignee: International Business Machines Corporation, Armonk, N.Y.

[21] Appl. No.: 396,046

[22] Filed: Feb. 28, 1995

[51] Int. Cl.$^6$ .................................................. G06F 11/00
[52] U.S. Cl. ................... 395/182.04; 395/441; 371/51.1
[58] Field of Search .................... 395/182.04, 782.03, 395/182.5, 185.05, 185.07, 187.04, 182.05, 182.03, 441; 371/40.1, 40.2, 40.4, 51.1, 11.1

[56] References Cited

U.S. PATENT DOCUMENTS

| | | | |
|---|---|---|---|
| 4,870,643 | 9/1989 | Bultman | 371/11.1 |
| 4,899,342 | 2/1990 | Potter et al. | 395/182.04 |
| 5,072,378 | 12/1991 | Manka | 371/40.1 |
| 5,202,979 | 4/1993 | Hillis et al. | 395/182.04 |
| 5,210,866 | 5/1993 | Milligan et al. | 395/182.04 |
| 5,388,108 | 2/1995 | DeMoss et al. | 371/51.1 |
| 5,479,611 | 12/1995 | Oyama | 395/182.04 |
| 5,522,065 | 5/1996 | Neufeld | 371/51.1 |
| 5,535,399 | 7/1996 | Blitz et al. | 395/182.04 |

OTHER PUBLICATIONS

Ng et al., "Maintaining Good Performance In Disk Arrays During Failure Via Uniform Parity Group Distribution", High Performance Distributed Computing, 1st Int'l Symp. 1992.

Ng "Some Design Issues of Disk Arrays", COMPCON IEEE Computer Society Int'l Conf. 1989.

Katz et al., "Disk System Architectures for High Performance Computing" Proceddings of teh IEEE vol. 77 Issue 12 Dec. 1989.

J. E. Donaldson et al., IBM Technical Disclosure Bulletin, "Distributed Check–Sum Approach for clustered Disk Drives", vol. 32 No.6b, Nov. 1989.

W.H. Tezlaff, IBM Technical Disclosure Bulletin, "Performance Assist for Checksum DASD", vol. 32 No. 7, Dec. 1989.

D. A. Patterson, et al., "A Case for redundant Arrays of Inexpensive Disks (RAID)", Report No. UCB/CSD 87/391, Dec. 1987, Computer Science Division (EECS), U C Berkeley, CA.

Seagate Technology, "RAID 5 Support on SCSI Disk Drives", Rev. 1.5, Jul. 13, 1994.

Massiglia (Editor), "The RAIDbook, A Source Book for Disk Array Technology", Edition 4, Jul. 12, 1994.

*Primary Examiner*—Hoa T. Nguyen
*Assistant Examiner*—Joseph E. Palys
*Attorney, Agent, or Firm*—Baker Maxham Jester & Meador

[57] ABSTRACT

A data storage system including a controller and a string of multiple DASDs, where each DASD is responsive to commands from the controller to perform local operations such as XOR functions and transferring data to other DASDs. A bus, which may comprise a serial or a parallel bus, electrically interconnects the controller and the DASDs. Each DASD includes a storage apparatus, an interface, a buffer, and processor. The buffer selectively receives data from the interface and the storage apparatus. In addition to other operations, the processor is responsive to commands from the controller to the buffer interface to perform an XOR operation on selected items of data in the buffer. The processor may additionally direct the results of the XOR operation to another DASD or to the controller. The data storage system of the invention may advantageously be operated to perform a task requiring the performance of multiple XOR operations, wherein each DASD performs an XOR operation on data and transmits the result to another DASD in accordance with a "daisy chain" specified for that task. Hence, controller workload is reduced and computational efficiency is increased by distributing the XOR operations among the DASDs.

17 Claims, 6 Drawing Sheets

UPDATE

REGENERATE

REBUILD

UPDATE (CACHED DATA)

UPDATE (FAILED DASD)

WRITE STRIPE

DATA STORAGE SYSTEM WITH LOCALIZED XOR FUNCTION

BACKGROUND OF THE INVENTION

1. Field of the Invention

The present invention relates to arrays of data storage media, such as redundant arrays of inexpensive disks ("RAIDs"). More particularly, the invention concerns a data storage system that employs a controller and multiple data storage devices, where each storage device includes a local Exclusive-OR ("XOR") generator to process received data and send the processed data to a different storage device or the controller. Hence, the data storage system of the invention may be operated to perform a task requiring the performance of multiple XOR operations, by distributing the XOR operations among the storage devices.

2. Description of the Related Art

Many engineers, strive to improve the storage capabilities of computers by employing advanced data storage systems such as RAIDs. In a general sense, RAID technology stores digital data by employing a multiplicity of identical direct access storage devices ("DASDs"). The concept of RAID technology is well known, and many different variations of RAID devices have been developed. See, for example, "A Case for Redundant Arrays of Inexpensive Disks (RAID)", Report No. UCB/CSD 87/391,December 1987 (also cited as Paterson et al., "A Case for Redundant Arrays of Inexpensive Disks (RAID)," Proceedings of the 1988 ACM SIGMOD Conference on Management of Data, Chicago, Ill., June 1988).

A typical RAID apparatus includes a RAID controller and a multiplicity of DASDs. Each DASD in turn includes multiple data storage disks, along with certain electronics such as a microprocessor and various memory buffers. Certain portions of each DASD are allocated to store parity bits corresponding to the other DASDs. Nonetheless, for ease of discussion, a RAID is often described as having a particular DASD that is dedicated for the storage of parity information.

In RAID systems, data is typically stored by striping the data across corresponding locations of different DASDs of the array. Parity bits for stored data are generated by applying the XOR function to the data. Therefore, if one DASD fails, the lost data can be reconstructed by applying the XOR function to data from the remaining DASDs and the corresponding parity data.

With many RAID storage systems, there are a number of standard functions:

1. Sequential Write,
2. Update write,
3. Update with cached data,
4. Update with a failed data DASD,
5. Update with failed parity DASD,
6. Regenerate lost data,
7. Rebuild lost data, and
8. Read data.

Sequential Writing simply involves storing data and its corresponding parity bits, in the DASDs. Specifically, writing involves striping a multi-block group of data across corresponding locations of the DASDs, calculating a block of parity bits corresponding to the striped data, and storing the parity block in the parity DASD. The parity block may be calculated, for example, by performing an XOR operation upon the blocks of write data. Update writing involves writing new data to a "target" DASD, and updating the parity bits corresponding to the new data. In particular, updating involves writing a new block of data from the controller to the target DASD, calculating an updated parity block to reflect the updated data, and storing the updated parity block. The updated parity block may be calculated, for example, by performing an XOR operation on the new (updated) data block, the old data block corresponding to the updated data block, and the corresponding old parity block. Updating with cached data involves writing new data from cache memory of the controller or one of the DASDs to a target DASD, and then storing the data and its parity bits. More particularly, updating with cached data involves writing a block of cached data to the target DASD, calculating an updated parity block to reflect the updated data, and storing the updated parity block. The updated parity bits may be calculated, for example, by performing an XOR operation upon the new (updated) cached data, the old cached data, and the old parity bits corresponding to the cached data. Updating with a failed data DASD involves the situation where new data is to be updated to a DASD, but that DASD has failed. Since data cannot be written to the failed DASD, the best that the RAID apparatus can do is to update the parity DASD to reflect the data that would otherwise be written. Accordingly, the process involves reading "old" data blocks from the non-failed data DASDs, calculating a parity block based on this data and the new data, and storing the updated parity bits on the parity DASD. The parity bits may be calculated, of course, by performing an XOR on the old data and the new data. Updating with a failed parity drive involves the situation where a block of data is to be updated to a target DASD, and the parity DASD has failed. For this operation, the updated data block is simply written to the target data DASD. Steps of updating the parity DASD are skipped.

Regenerating lost data from a failed DASD involves reconstructing data from a failed DASD, and providing it to the RAID controller. Specifically, this process involves reading corresponding blocks of data from all non-failed DASDs, reconstructing the lost data block based on the read data blocks, and transmitting the reconstructed data block to the controller. The lost data block may be reconstructed, for example, by performing an XOR upon data blocks read from the non-failed DASDs. Rebuilding involves reconstructing a data block from a previously failed (now operative) target DASD, writing the reconstructed data block to the target DASD, and updating the parity block. Reading data involves reading data blocks stored at one of more of the DASDs.

Through the years, scientists have developed a number of different variations on the RAID theme. Many of these are directed at the RAID-5 scheme, which is employed in the present discussion for illustrative purposes. RAID systems are typically arranged in either a centralized or a distributed configuration. In the centralized arrangement, the RAID controller performs many functions on behalf of the DASDs, playing a dominant role in executing the various RAID functions discussed above. The controller here acts like the RAID system's "brain", providing commands to the individual DASDs, collecting information from the DASDs, and orchestrating the processing and storage of data in the DASDs. The controller may, for example, manage the generation of parity bits and orchestrate the reconstruction of data when one of the DASDs fails. One important feature of the centralized RAID system is that the controller performs all XOR functions that must be performed upon data written to the drives or retrieved therefrom.

The distributed system, on the other hand, vests a great deal of responsibility in the individual DASDs. In distributed systems, the controller manages the DASDs to some degree, but one of the DASDs typically assumes a significant role in managing specific operations of the other DASDs. One proposed distributed RAID system, employing a number of principles useful for understanding this invention, is referred to herein as the "external-XOR" approach. In this regard, the XOR function is "external" to the controller, but local to the DASDs. Such local computations may be subsequently combined to aid in lost data reconstruction, parity calculation, and the like. As shown in FIG. 1, the external-XOR approach concerns a RAID apparatus 100 that uses a central controller 102 connected to multiple DASDs 104–107. Each DASD 104–107 includes a buffer, an XOR circuit, and a storage device such as a disk drive. For instance, the DASD 104 includes a buffer 104a, an XOR circuit 104b, and a disk drive 104c.

In FIG. 1, each of the DASDs 104–107 is connected to the other DASDs 104–107 and the controller 102 by a bus 110. Under the external-XOR scheme, the controller 102 initiates an array operation by designating an initiator DASD, and issuing a single SCSI command to the designated initiator DASD. In the example of FIG. 1, the initiator DASD is the DASD 107. The initiator DASD 107 assumes the role of a SCSI initiator to complete the operation requested by the controller 102. Namely, the initiator DASD 107 completes the operation in a manner that is external to the controller 102, reporting the ending status back to the controller 102 when finished. In general, error recovery is the responsibility of the DASDs. For errors that are unrecoverable at the DASD level, however, there exists a procedure for transferring error recovery responsibility to the controller 102.

The external-XOR approach has a number of attractive features. This approach reduces the workload of the RAID controller, for one. Also, localizing the XOR function may avoid the need for a special RAID controller; in some cases, the RAID apparatus may even be compatible with a common SCSI controller.

For certain applications, however, system performance under the external-XOR approach might not meet some users' expectations. Where the controller 102 designates multiple initiators, for example, the DASDs 104–107 may be under the inconsistent control of multiple initiators at the same time. In particular, there will be some delay between the controller's issuance of a command, and the receipt of that command by any of the DASDs. Therefore, the opportunity exists for successive commands to be received and executed in an unpredictable, and possibly incorrect, order. In some cases, this might compromise data integrity.

Another potential pitfall of the external-XOR approach concerns computational efficiency. In particular, this approach performs an excessive number of tasks for certain RAID operations. As an example, FIG. 2 illustrates the behavior of an external-XOR apparatus 200 during a sequential write operation. The apparatus 200 includes a controller 202, data DASDs 204–206, and a parity DASD 208. The external-XOR apparatus 200 performs a sequential write operation as follows. First, the controller 202 issues XOR data write ("XDW") commands 204a–206a to the DASDs 204–206, where there is one command for each DASD. Along with each write command, the controller 202 provides a data block to be written to the corresponding DASD. The data blocks are indicated by 204b–206b.

Upon receipt of the commands and data blocks, the DASDs 204–206 write the appropriate data to their disk drives. Additionally, each DASD applies the XOR function to the new data and the old data to be replaced. The product of these XOR operations provides data that will be used subsequently to generate parity bits stored by the parity DASD 208. Accordingly, in the next step the DASDs 204–206 send the parity DASD 208 the calculated parity bits 204c–206c, along with XOR parity write ("XPW") commands 204d–206d. Then, the parity DASD 208 uses the received data to calculate the final parity bits, which are written to the disk drive of the parity DASD 208. As shown by the discussion of the present invention below, the external-XOR approach requires an excessive number of operations in circumstances such as those illustrated by FIG. 2.

In addition, another potential shortcoming of the external-XOR approach is that certain operations place an excessive load upon the initiator DASD. One example is the regenerate operation, which is performed by the apparatus 200 as shown in FIG. 3. The regenerate operation is performed to reconstruct a "missing" data block that cannot be retrieved because it is located on a failed DASD 300; the regenerate command also provides the regenerated data to the controller 202.

First, the controller 202 issues a regenerate command 302 to an initiator DASD. In the example of FIG. 3, the initiator DASD is the DASD 208. The initiator DASD 208 then sends READ commands 304–306 to the non-failed DASDs 204–206 to retrieve data blocks corresponding to the missing data block. In response, each of the DASDs 204–206 sends the initiator DASD 208 a requested data block 308–310. The initiator DASD 208 also retrieves a data block from its own disk drive, corresponding to the missing data block. Then, the controller 202 sends the initiator DASD 208 an XOR data read ("XDR") command to the initiator DASD 208. In response, the initiator DASD 208 performs an XOR operation on the data blocks, effectively reproducing the missing data blocks, and then returns the regenerated data block to the controller 202.

As shown above, the external-XOR approach relies heavily on the initiator DASD 208 in performing the regenerate operation. The initiator DASD 208 must send commands to each of the other DASDs, receive data blocks therefrom, retrieve one of its own data blocks, perform an XOR operation upon all of the retrieved data blocks, and return the XOR result to the controller 202. As a result, the initiator DASD 208 may produce a bottleneck that significantly slows the operation of the apparatus 200. Due to the heavy loading of the initiator DASD 208, a substantial amount of computational time is needed to carry out the XOR operation. Additionally, this heavy loading dictates that the initiator DASD 208 employ more hardware, such as memory buffers and buffer cycles.

Furthermore, although the external-XOR arrangement divests the controller of a significant workload, the high level of responsibility vested in the initiator DASD effectively renders the initiator DASD itself a "controller". Accordingly, the initiator DASD must contain the requisite intelligence, such as microcode and control circuitry, to communicate with and manage the other DASDs.

SUMMARY OF THE INVENTION

In a general sense, one aspect of the present invention concerns a data storage system for storing machine-readable data. This system includes a controller, and multiple DASDs, and a bus to electrically interconnect the controller and the DASDs. Each DASD includes a storage device to store machine-readable data, and an interface electrically connected to the bus. Additionally, each DASD includes one or more buffers to selectively store data received from the interface and the storage device. Each DASD also includes a processor operable in response to commands from the controller to select blocks of data received into the buffer, and perform an XOR operation on the selected blocks. The processor may also direct the results of its operations via the bus to a destination such as another DASD or the controller.

Advantageously, the data storage system of the invention may be operated to perform a task requiring the performance of multiple XOR operations, by distributing performance of the XOR operations among the DASDs. More specifically, the data storage system may be operated to sequentially transmit data among the DASDs in a selected "daisy chain" order, where multiple ones of the DASDs perform an XOR operation on the data prior to transmitting the data to the next DASD in the daisy chain.

Accordingly, the invention affords its users with a number of distinct advantages. First, the invention provides greater reliability than previous arrangements. Additionally, the invention provides more computational efficiency than known configurations. The invention reduces the workload of the controller, and avoids over working any DASD by distributing the processing workload among the DASDs.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

In a general sense, the present invention comprises a data storage system including a controller and multiple DASDs, where the DASDs are capable of processing and sequentially transmitting data among themselves to reduce the computational workload at the controller, and thereby achieve improved computational efficiency and data reliability.

HARDWARE COMPONENTS & INTERCONNECTIONS

Figure 1:
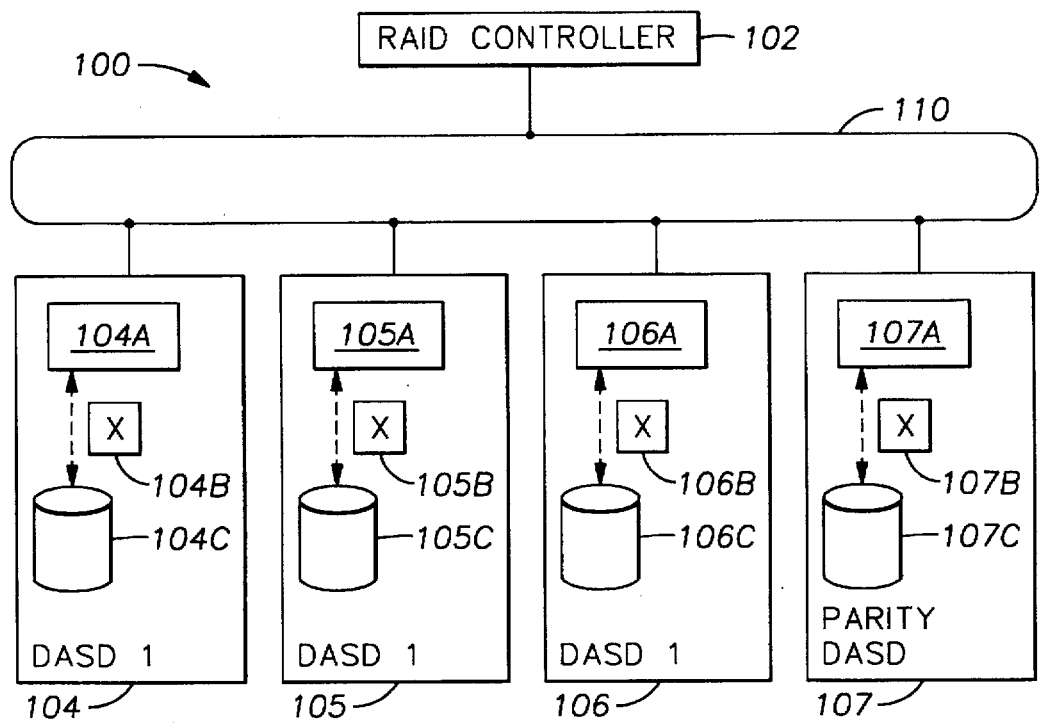
FIG. 1 is a block diagram of a RAID apparatus 100 in accordance with an "external-XOR" architecture.
Figure 2:
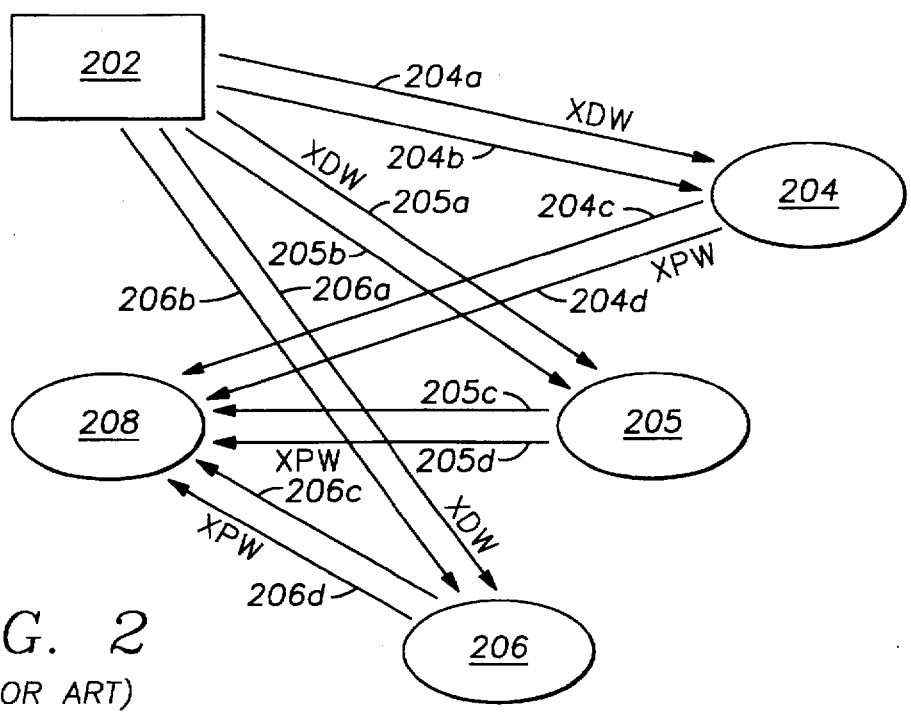
FIG. 2 is a data flow diagram of an external-XOR RAID apparatus 200, illustrating the operations required to perform a "sequential write" operation.
Figure 3:
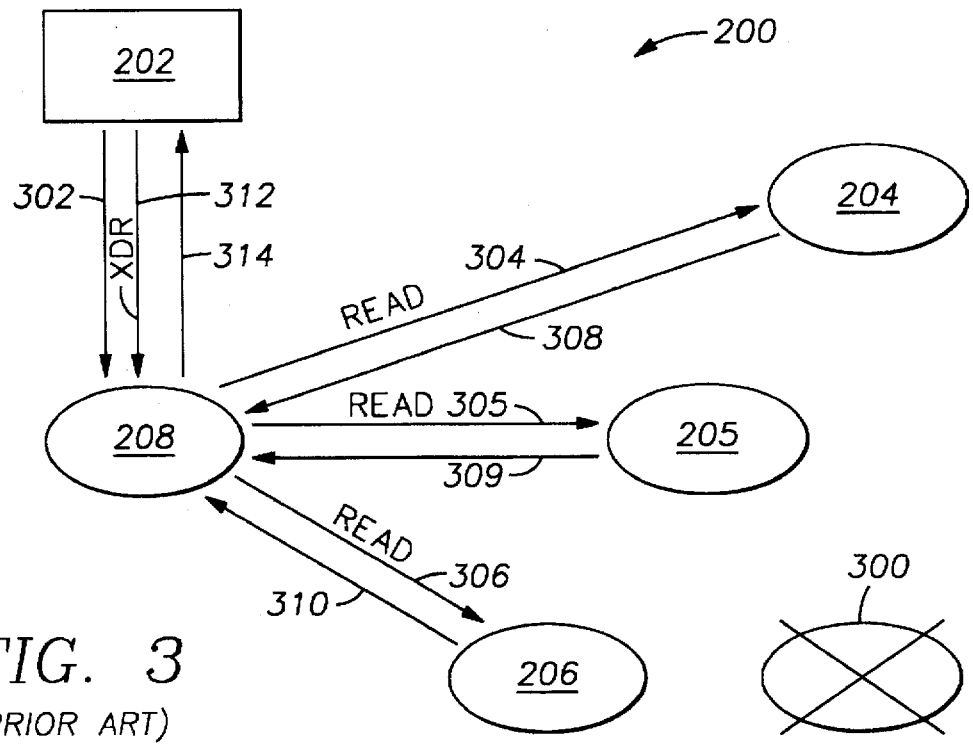
FIG. 3 is a data flow diagram of the external-XOR RAID apparatus 200, illustrating the operations required to perform a "regenerate" operation.
Figure 4:
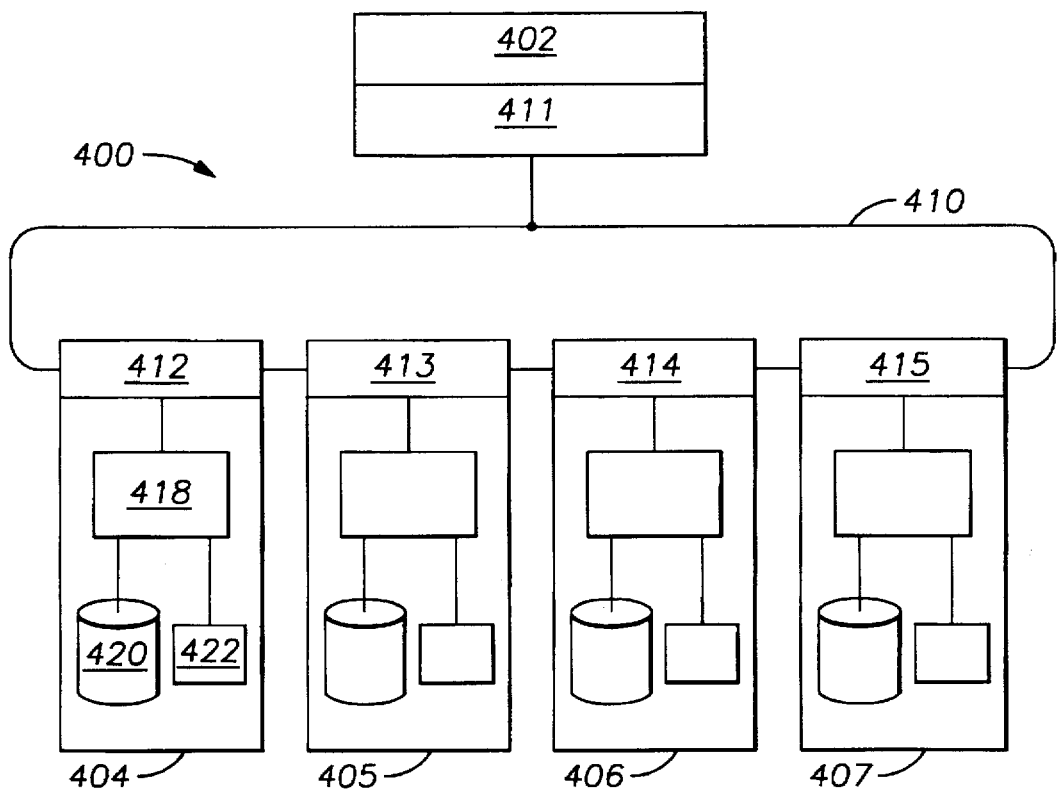
FIG. 4 is a block diagram of a data storage system in accordance with the present invention.

FIG. 4 illustrates the preferred data storage system 400 of the present invention. The system 400 preferably embodies the RAID-5 protocol, although RAID-1, RAID-3, or another RAID configuration may be used. The system 400 includes a controller 402, electrically connected to DASDs 404–407. In an illustrative embodiment, the controller 402 comprises discrete circuit components or an application specific integrated circuit ("ASIC") to perform the operations described herein. Alternatively, the controller 402 may comprise a digital computing system, which runs software appropriate to execute the functions described herein.

In a preferred implementation, the DASDs 404–407 and the controller 402 are connected by a bus 410. More specifically, the controller 402 includes an interface 411, and each of the DASDs 404–407 include interfaces 412–415, respectively. The interfaces 412–415 preferably comprise serial interfaces compatible with the SCSI command set, such as the Serial Storage Architecture. The bus 410 interconnects the interfaces 411–415 in one continuous loop, where each interface is connected between two adjacent interfaces. A duplicate bus (not shown) may also be provided, either to convey information between duplicate DASD interfaces (not shown) or to provide a backup in case the bus 410 fails.

Other configurations may be used instead for interconnecting the controller 402 and the DASDs 404–407. For example, the controller 402 and DASDs 404–407 may be attached in parallel to a common bus, or a Fiber Channel Arbitrated Loop type interconnection may be used. Alternatively, a different scheme of interconnection may be used, which provides some means for exchanging signals between the controller 402 and each of the DASDs 404–407, and between any DASD and another DASD.

Figure 5:
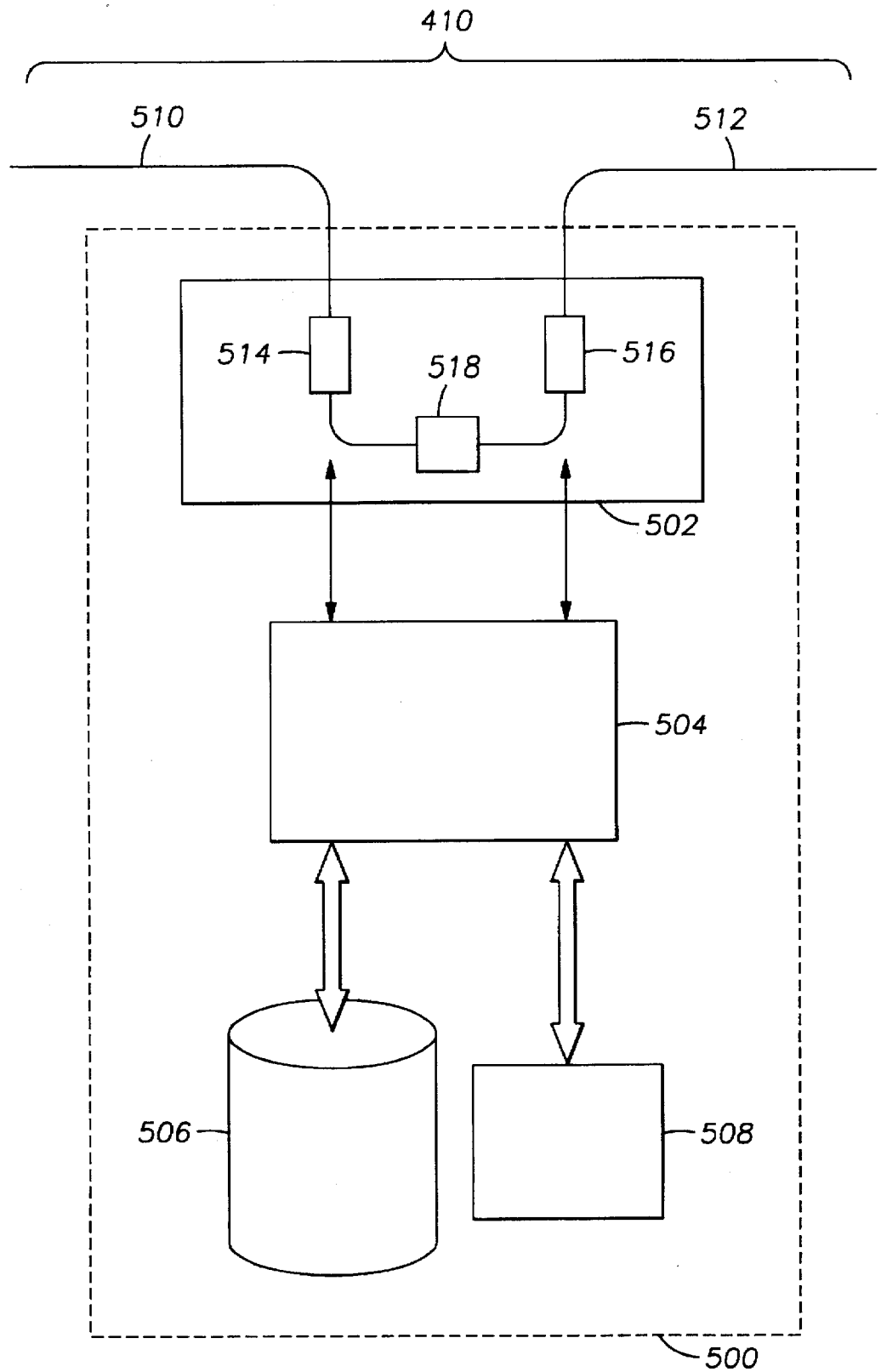
FIG. 5 is a more detailed block diagram showing the hardware components and interconnections of a DASD in accordance with the present invention.

In an illustrative embodiment, each DASD 404–407 includes an interface, a processor, a buffer, and a storage device. In the case of the DASD 404, FIG. 4 illustrates an interface 412, a processor 418, a data storage device 420, and a buffer 422. The components of a typical DASD 500 appear in greater detail in FIG. 5. The DASD 500 includes an interface 502, a processor 504, a data storage device 506, and a buffer 508. The interface 502 includes first and second buffers 514, 516 electrically connected to first 510 and second ends 512 of the bus 410. The interface 502 also includes a gate 518 to selectively exchange signals between the ends 510, 512 of the bus 410, and also to assist the processor 504 in performing operations upon data received from the bus 410.

The processor 504 is electrically connected to the buffers 514, 516 to exchange data therewith. The processor 504 may comprise a microprocessor, discrete logic circuitry, or an ASIC to process data and manage operations of the DASD 500 in accordance with the invention. In an illustrative embodiment, the processor 504 may comprise a model '80186 microprocessor, or a combination of Western Digital model WD33C96 and WD61C40 circuits, for example. The processor 504 is also electrically connected to the storage device 506 and the buffer 508.

In an illustrative embodiment, the storage device 506 may comprise a hard disk drive with one or more spinning magnetic recording media. Alternatively, the DASDs 404–407 may comprise optical disk drives, magnetic tape drives, floppy or rigid diskettes, random access memory ("RAM"), or other suitable computer-readable data storage devices. The buffers 508, 514, and 516 preferably comprise DRAM buffers, and the buffer 508 may be advantageously partitioned into a number of subsidiary buffers for reasons discussed below.

METHOD OF OPERATION

In addition to the various embodiments of data storage system described above, the present invention also contemplates a method for operating such a system. Generally, to operate the data storage system of the invention, the controller 402 (FIG. 4) sends commands and data to the DASDs 404–407 via the bus 410. The DASDs 404–407 respond by performing various local tasks, as required to assist in performing read, write, regenerate, and other operations of the overall data storage system. An advantageous feature of an illustrative embodiment of the invention is that XOR operations are distributed among the DASDs 404–407; thus, for a given function requiring XOR operations, no DASD is required to execute multiple XOR operations and thereby assume an inordinate share of the processing workload.

Command Set

In an illustrative embodiment of the invention, the controller 402 can conduct a variety of specific operations (described below) by selecting and issuing various commands to the DASDs 404–407. In an illustrative embodiment of the invention, each DASD may employ its gate 518 to selectively exchange signals between the processor 504 and the buffers 514, 516. For example, where the controller 402 issues a command intended for the DASD 406, the controller 402 may place the command on the bus 410, whereupon it is forwarded via the interfaces 412, 413, and 414 to the interface 415. In this situation, the gate 518 of each interface 412, 413, 414 recognizes that the command was intended for another DASD, and accordingly directs signals from the buffer 514 to the buffer 516, in effect connecting the ends 510, 512 of the bus 410.

Each command is selected from a "command set" that includes all commands recognized by the DASDs 404–407. In an exemplary embodiment of the invention, the command set may include the following commands: WRITE, XT, XW, XTW, XTW/NR, TW, READ, AND TRANSFER.

WRITE

This command directs a target DASD 500 to store certain incoming data in its storage device 506. In this respect, "incoming" data refers to data obtained by the interface 502 from the bus 410. Accordingly, the incoming data may originate from a source such as the controller 402, another DASD, or another controller (not shown) if provided. If the incoming data is to be provided from a source other than the controller 402, the controller 402 also sends a TRANSFER command (described below) to the data source.

XT

This command directs a target DASD 500 to read certain data from its storage device 506, perform an XOR on a combination of that data and certain incoming data, and forward the XOR result to a secondary target. For purposes of the present discussion, a "secondary target" may comprise another DASD, the controller 402, or a different controller (not shown) if present. As with the WRITE command, the incoming data may originate from a source such as the controller 402, another DASD, or another controller (not shown) if provided. If the incoming data is to be provided from a source other than the controller 402, the controller 402 also sends a TRANSFER command to the data source.

When a target DASD 500 receives an XT command, the interface 502 receives the incoming data, and the storage device 506 reads the data specified by the XT command. These items of data are preferably stored in the buffer 508 for further processing. Specifically, the processor 504 performs an XOR operation on the read data and the incoming data contained in the buffer 508. Then, the target DASD 500 then assumes a limited role as a secondary initiator. In particular, the processor 504 issues a TRANSFER command (discussed below) to transmit the XOR result to a specified secondary target via the bus 410.

The target DASD 500 may identify the secondary target in a number of different ways, in accordance with the specific embodiment of DASD that is implemented. In one embodiment, the target DASD 500 may consult a table locally stored in that DASD 500, to determine where to send the XOR results. This table considers the relationship of the target DASD 500 to the other DASDs, the command received from the controller 402, and the source of the XOR data; this information is used to guide the target DASD 500 in selecting the appropriate secondary target. Alternatively, in an another embodiment, the command from the controller 402 contains parameters that specifically instruct the target DASD 500 where to transmit the information. Both of the embodiments described above may be implemented by an ordinarily skilled artisan having the benefit of this disclosure.

XW

This command directs a target DASD 500 to perform an XOR operation on certain incoming data and certain data from its storage device, and to write the XOR result to the storage device. As with the XT command, the incoming data may originate from the a source such as the controller 402, another DASD, or another controller (not shown) if provided.

When a target DASD 500 receives an XW command, the interface 502 receives the incoming data, and the storage device 506 reads the data specified by the command. These items of data are preferably stored in the buffer 508 for further processing. Then, the processor 502 performs an XOR operation on the two items of data contained in the buffer 508, and the storage device 506 stores the XOR result.

XTW

This command directs a target DASD 500 to perform an XOR operation on certain incoming data and certain data from its storage device 506, write the incoming data to its storage device 506, and transfer the XOR result to a secondary target. The interface 502 receives the incoming data via the bus 410, and the incoming data may originate from the controller 402, another DASD, or another source (not shown).

When a target DASD 500 receives an XTW command, the storage device 506 reads the data specified by the command, the interface 502 receives the incoming data, and the processor 504 performs an XOR operation on the two items of data. Preferably, the two items of data are contained in the buffer to assist the processor 504. Then, the storage device 506 stores the incoming data. Next, the target DASD 500 assumes a limited role as a secondary initiator, wherein the processor 504 issues a TRANSFER command to transmit the XOR result to a specified secondary target via the interface 502 and the bus 410.

XTW/NR

This command directs a target DASD 500 to perform an XOR operation on an old block and a new block of incoming data, write the new data block to the target DASD's storage device, and transfer the XOR result to a secondary target. The new incoming data block originates from the controller 402, and the old data block may originate from the controller 402 or another DASD. The target DASD receives both blocks of incoming data via the bus 410.

When a target DASD 500 receives an XTW/NR command, its interface 502 receives the two incoming data blocks and the buffer 508 preferably stores the data blocks. Then the processor 504 performs an XOR operation on the two data blocks, and the storage device 506 stores the new data block. In the case of two data blocks received from the controller 402, the new data block may be identified, for example, by being the first data block transmitted to the target DASD 500. Where the target DASD 500 receives the new data block from the controller 402 and the old data block from another DASD, the target DASD's storage device 506 stores the data block received from the controller 402 (i.e. the new data block).

After the storage device 506 stores the new data block from the incoming data, the DASD 500 assumes a limited role as a secondary initiator, wherein the processor 504 issues a TRANSFER command to transmit the XOR results to the specified secondary target via the interface 502 and the bus 410.

TW

This command directs the target DASD 500 to write incoming data to its storage device 506, and also to transfer the incoming data to a secondary target. Specifically, in response to a TW command, the interface 502 receives the incoming data, the storage device 506 stores the incoming data, and the DASD 500 assumes a limited role as a secondary initiator whereby the processor 504 issues a TRANSFER command to transmit the data to a secondary target.

READ

This command causes the target DASD 500 to read data from a specified address of its storage device 506 and transfer the read data to a secondary target via the bus 410. The READ command specifies the address of the storage device 506 to read from. The data read from the storage device 506 may in an illustrative embodiment, be transferred to the buffer 508 and then directed to the interface 502 en route to the secondary target.

TRANSFER

This command, issued by a data source, prepares a target DASD 500 to receive data into its storage device 506 from the data source. When the secondary target receives the transferred data, this permits the secondary target to complete an operation previously commanded by the controller 402. More specifically, the TRANSFER command may be used by a first DASD to complete a command previously issued by the controller 402, and thereby aid a second DASD in receiving data from the first DASD. Specifically, in this embodiment, the first DASD may send the TRANSFER command to the second DASD to give advance warning that data is on its way to the second DASD from the first DASD.

Comprehensive Master Operations

The command set, described above, comprises a group of individual commands that are transmitted to individual DASDs to obtain some specific result therein. More importantly, by issuing selected ones of these commands to multiple DASDs as part of a common scheme, the controller 402 can initiate comprehensive master operations in the DASDs, with a minimum of workload actually performed by the controller 402. One important feature of the present invention, described in greater detail below, is that certain of the master operations may advantageously employ a "daisy-chain" transfer of data through the DASDs 404–407. With the daisy-chain data transfer, data is passed serially through each of the DASDs, beginning with an initiator DASD, continuing through multiple intermediate DASDs, and finally arriving at a receiver DASD. Preferably, the data is transferred through each DASD in the daisy-chain only once. As discussed in greater detail below, in some cases a DASD may process the data prior to transmitting it; in other cases a DASD may simply transmit the data without any processing, thereby acting as a conduit. As an example of this processing, each intermediate DASD may perform an XOR operation upon the data received from the previous DASD in the daisy-chain along with another item of data that is received from the controller 402 or the storage device of that intermediate DASD. In this way, the daisy-chain transfer of the invention distributes the XOR task among the DASDs, thereby easing the load of the controller 402 and ensuring that no single DASD is disproportionately burdened.

As illustrated in FIGS. 6–11 and described below, these comprehensive master operations include UPDATE, REGENERATE, REBUILD, UPDATE (CACHED DATA), UPDATE (FAILED DASD), AND WRITE STRIPE.

UPDATE

Figure 6:
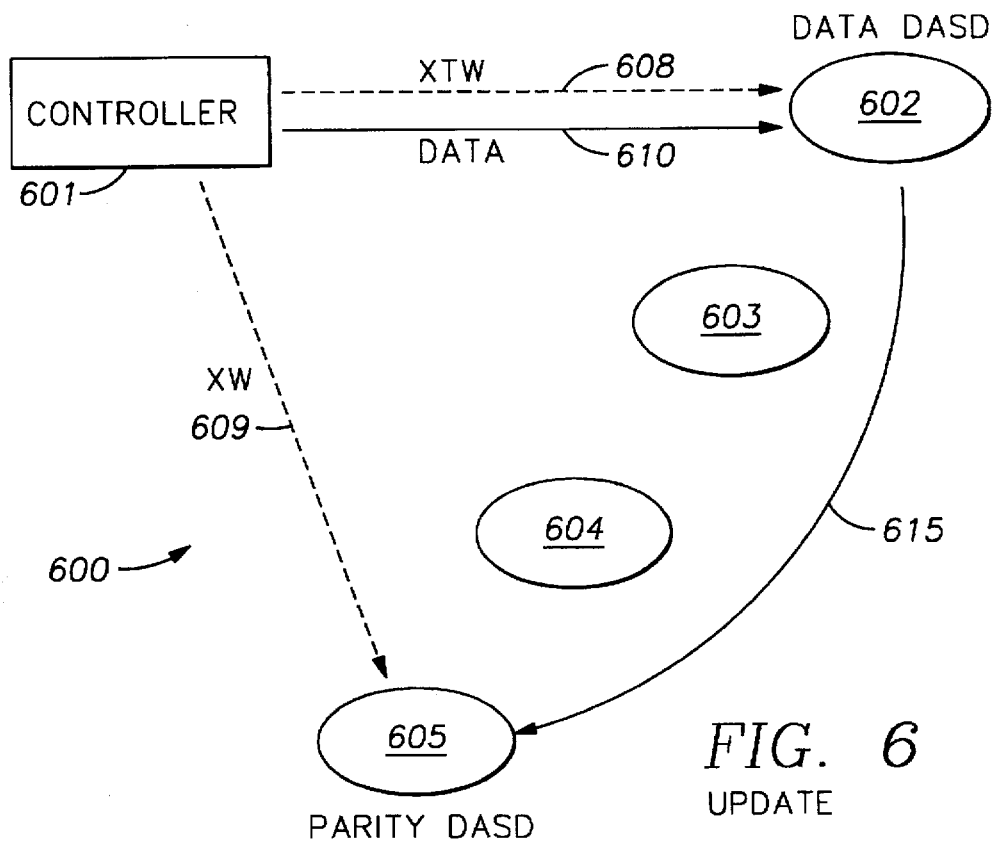
FIG. 6 is a data flow diagram illustrating the sequence of operations to perform an UPDATE task in accordance with the invention.

This operation generally writes a new data block to a target DASD, and updates the parity bits corresponding to the new data. To explain the UPDATE WRITE operation more specifically, reference is made to FIG. 6. FIG. 6 illustrates a data storage system 600 that includes a controller 601 and DASDs 602–605. The DASD 605 is designated as the parity DASD. However, it is understood that it may be preferable to allocate certain portions of each DASD to store parity bits corresponding to the other disk DASDs. Nonetheless, for ease of discussion, the system 600 is described as having a particular DASD 605 that is dedicated for the storage of parity information.

The controller 601 initiates the UPDATE operation by transmitting an XTW command 608 and a block of new data 610 to the DASD 602, and transmitting an XW command 609 to the DASD 605, with parameters appropriate to perform the following sequence. In accordance with the XTW command as described above, the DASD 602 performs an XOR operation upon the new data 610 and the corresponding data from its storage device to yield an XOR result 615. Then the DASD 602 writes the new data 610 to its storage device, and transfers the XOR result to the parity DASD 605. The parity DASD 605, in accordance with the received XW command 609, performs an XOR operation on the received XOR result 615 and data read from its storage device, and writes the result of this XOR operation to its storage device.

Hence, the new data block 608 is written to the DASD 602, and the corresponding parity is updated in the parity DASD 605.

REGENERATE

Figure 7:
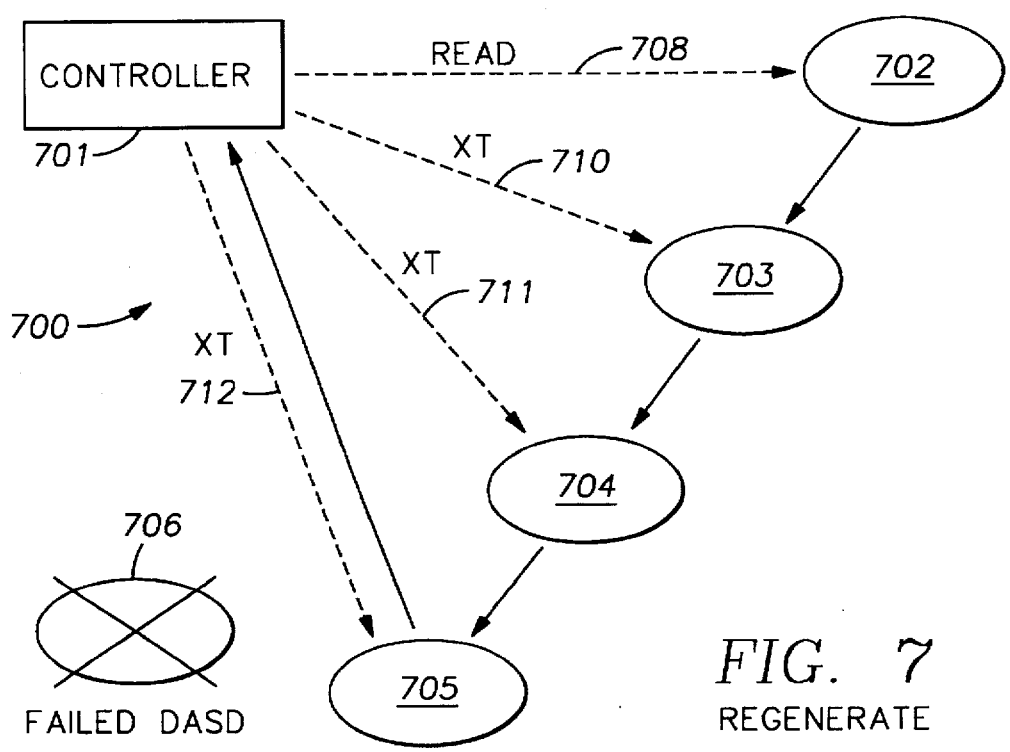
FIG. 7 is a data flow diagram illustrating the sequence of operations to perform a REGENERATE task in accordance with the invention.

The REGENERATE command is illustrated in FIG. 7, which illustrates a data storage system 700 that includes a controller 701 and DASDs 702–706, where the DASD 706 has failed. The controller 701 initiates the REGENERATE operation by transmitting a READ command 708 to the DASD 702, and transmitting XT commands 710–712 to the DASDs 703–705, with parameters appropriate to perform the following sequence. In accordance with the READ command as described above, the DASD 702 reads the data block requested by the command 708 from its storage device, and transfers it to the DASD 703. After each DASD 703–705 receives a data block from another DASD, it performs an XOR operation upon that data block and the corresponding data from its storage device, and transfers the XOR result to the next DASD in sequence. In the case of the DASD 705, the XOR result is forwarded back to the controller 701. The parameters issued by the controller 701 accompanying the commands 708, 710–712 determine the order of data transfer between the DASDs 702–705 (e.g. from the DASD 702 to the DASD 703, and then to the DASD 704, etc.).

Hence, data from the desired location of the failed DASD 706 is reconstructed by a daisy chain XOR computation in the DASDs 702–705, and provided to the controller 701.

REBUILD

Figure 8:
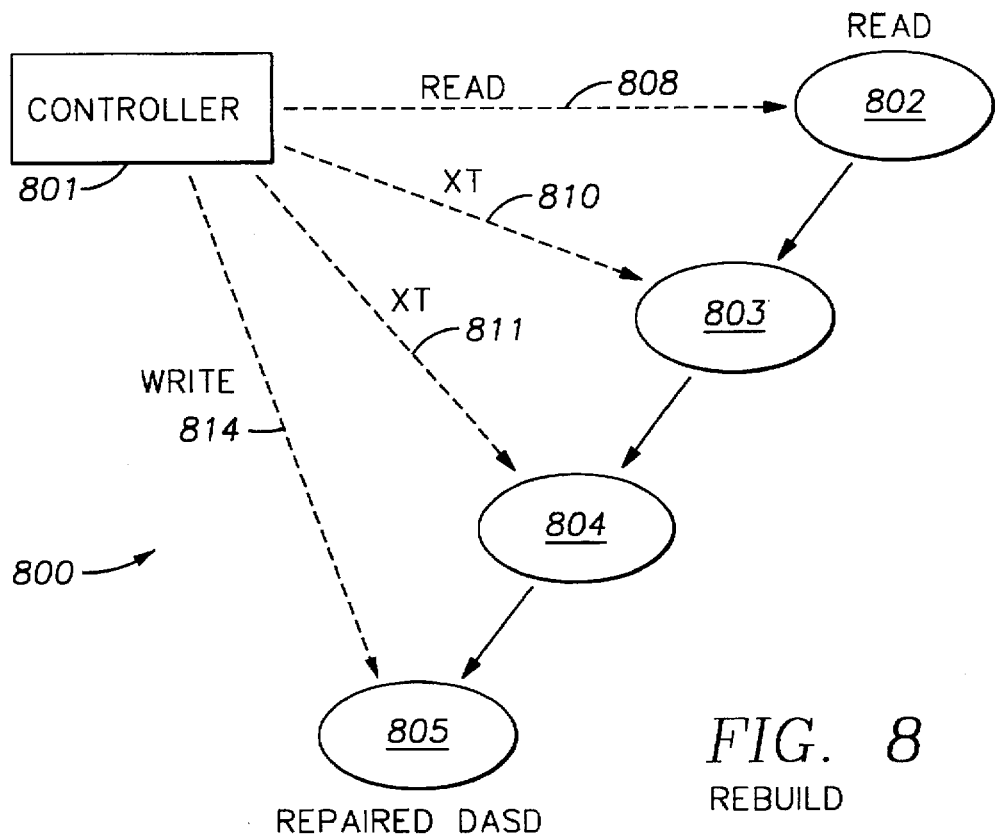
FIG. 8 is a data flow diagram illustrating the sequence of operations to perform a REBUILD task in accordance with the invention.

The REBUILD command is illustrated in FIG. 8, which illustrates a data storage system 800 that includes a controller 801 and DASDs 802–805, where the DASD 805 is designated as the drive having data that must be rebuilt. The controller 801 initiates the REBUILD operation by transmitting a READ command 808 to the DASD 802, transmitting XT commands 810–811 to the DASD 803–804, and transmitting a WRITE command 814 to the DASD 805, all commands being accompanied by parameters appropriate to perform the following sequence. In accordance with the READ command as described above, the DASD 802 reads the data requested by the READ command 808 from its storage device, and transfers it to the DASD 803. After the DASD 803 receives the data block from the DASD 802, it performs an XOR operation upon that data block and the corresponding data from its storage device, and transfers the XOR result to the next DASD 804 in sequence. The DASD 804 performs similar operations as the DASD 803. The DASD 805 simply receives the XOR result from the DASD 804, and stores that result in its own storage device (i.e. the storage apparatus of the DASD 805).

Hence, data from the desired location of the DASD 805 is rebuilt by a daisy chain XOR computation of the DASDs 803–804, and written back to the appropriate location of the DASD 805. Similar to the REGENERATE operation described above, the parameters issued by the controller 801 accompanying the commands 808, 810–811, and 814 determine the order of the data transfer between the DASDs 802–805.

UPDATE (CACHED DATA)

Figure 9:
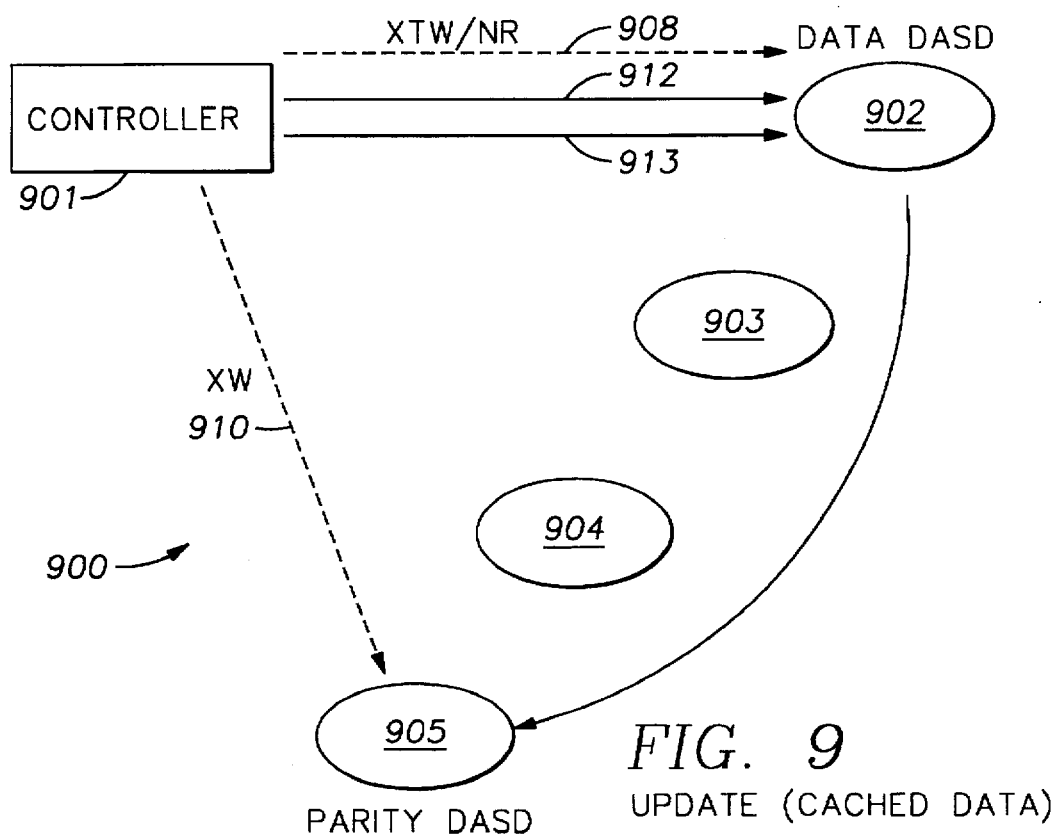
FIG. 9 is a data flow diagram illustrating the sequence of operations to perform an UPDATE (CACHED DATA) task in accordance with the invention.

The UPDATE (CACHED DATA) command is illustrated in FIG. 9, which depicts a data storage system 900 that includes a controller 901 and DASDs 902–905. The DASD 905 is designated as the parity DASD. However, it is understood that it may be preferable to allocate certain portions of each DASD to store parity bits corresponding to the other DASDs. Nonetheless, for ease of discussion, the system 900 is described as having a particular DASD 905 that is dedicated for the storage of parity information.

The UPDATE (CACHED DATA) operation generally updates a target DASD 902 by storing a new data block therein, and also updates the parity DASD 905 accordingly. However, unlike the UPDATE operation of FIG. 6, the old data block to be replaced by the new data block has been previously cached in the controller 901; therefore, the target DASD 902 does not need to read the old data block from its storage device, and the operation can be conducted more quickly.

The controller 901 initiates the UPDATE (CACHED DATA) operation by transmitting an XTW/NR command 908, a new data block 912, and an old data block 913 to the DASD 902. The controller 901 also transmits an XW command 910 to the parity DASD 905. These commands are transmitted with parameters appropriate to perform the following sequence. In accordance with the XTW/NR command as described above, the DASD 902 performs an XOR operation upon the data blocks 912–913, writes the new data block 912 to the storage device of the DASD 902, and transfers the XOR result to the parity DASD 905. In accordance with the XW command (described above), the parity DASD 905 calculates a final XOR result by performing an XOR upon the received XOR result and the corresponding data from its storage device. Then, the parity DASD 905 stores the final XOR result in the corresponding location of its storage device.

Hence, the new data block 912 is written to the DASD 902, and the corresponding parity is updated in the parity DASD 905.

UPDATE (FAILED DASD)

Figure 10:
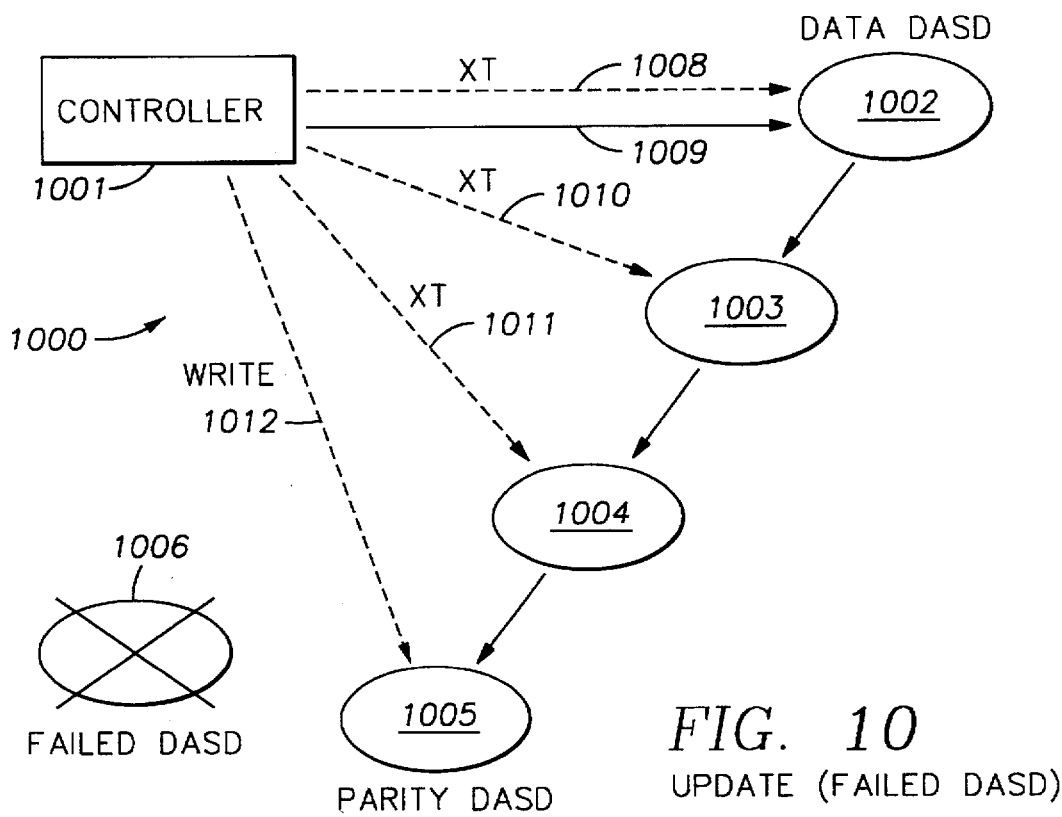
FIG. 10 is a data flow diagram illustrating the sequence of operations to perform an UPDATE (FAILED DASD) task in accordance with the invention.
Figure 11:
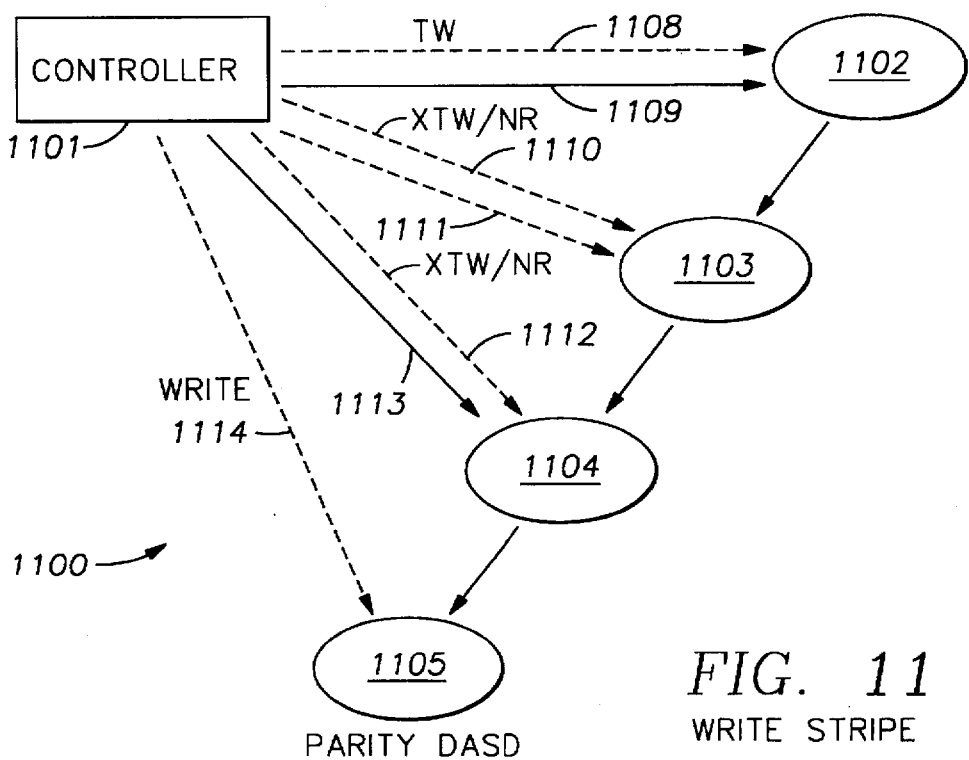
FIG. 11 is a data flow diagram illustrating the sequence of operations to perform a WRITE STRIPE task in accordance with the invention.

This operation generally serves to update the parity bits corresponding to a data block that cannot itself be updated because of a failure of the DASD on which that block is stored. To explain the UPDATE (FAILED DASD) operation more specifically, reference is made to FIG. 10. FIG. 10 illustrates a data storage system 1000 that includes a controller 1001 and DASDs 1002–1005. The DASD 1005 is designated as the parity DASD. However, it is understood that it may be preferable to allocate certain portions of each DASD to store parity bits corresponding to the other DASDs. Nonetheless, for ease of discussion, the system 1000 is described as having a particular DASD 1005 that is dedicated for the storage of parity information.

The controller 1001 initiates the UPDATE (FAILED DASD) operation by transmitting an XT command 1008 and a block of new data 1009 to a target DASD 1002, transmitting XT commands 1010–1011 to the DASDs 1003–1004, and sending a WRITE command 1012 to the DASD 1005, with parameters appropriate to perform the following sequence. In accordance with the XT command as described above, the first DASD 1002 performs an XOR operation upon the new data 1009 and the corresponding data from its storage device, and forwards the XOR result to the DASD 1003.

Likewise, the DASDs 1003–1004 perform XOR operations upon data received from the DASDs 1002 and 1003, respectively, and data corresponding from their storage devices. These XOR results are forwarded to DASDs 1004 and 1005, respectively, as shown in FIG. 10. In accordance with the WRITE command described above, the parity DASD 1005 receives an XOR result from the DASD 1004, and stores this result by writing it to the storage device of the DASD 1005.

Hence, although the new data block 1009 is not written to the failed DASD 1006, a daisy chain XOR computation of the DASDs 1002–1004 nonetheless updates the parity DASD 1005.

WRITE STRIPE

This operation generally writes a "stripe" of new data blocks to the DASDs, and updates the parity bits corresponding to the blocks of new data. To explain the WRITE STRIPE operation more specifically, reference is made to FIG. 11, which illustrates a data storage device 1100 that includes a controller 1101 and DASDs 1102–1105. The DASD 1105 is designated as the parity DASD. It is understood, however, that it may be preferable to allocate certain portions of each DASD to store parity bits corresponding to the other DASDs. Nonetheless, for ease of discussion, the system 1100 is described as having a particular DASD 1105 that is dedicated for the storage of parity information.

The controller 1101 initiates the WRITE STRIPE operation by transmitting a TW command 1108 and a block of new data 1109 to the DASD 1102, transmitting an XTW/NR command 1110 and a block of new data 1111 to the DASD 1103, transmitting an XTW/NR command 1112 and a new data block 1113 to the DASD 1104, and transmitting a WRITE command 1114 to the parity DASD 1105. These commands are transmitted with appropriate parameters to perform the following sequence. In accordance with the TW command as described above, the DASD 1102 receives the data block 1109 and stores it in the storage device corresponding to the DASD 1102. The DASD 1102 also transfers the received data block 1109 to the DASD 1103. In accordance with the XTW/NR command as described above, the DASD 1103 receives the new data block 1111, receives the data block transferred from the DASD 1102, and performs an XOR upon the two data blocks. The DASD 1103 also writes the new data block 1111 to its storage device, and transfers its XOR result to the DASD 1104. Likewise, the DASD 1104 receives the new data block 1113, receives the data block 1113 transferred from the DASD 1103, and performs an XOR upon the two data blocks. The DASD 1104 also writes the new data block 1113 to its storage device, and transfers its XOR result to the parity DASD 1105. In accordance with the WRITE command 1114, the parity DASD 1105 writes the XOR result received from the DASD 1104 to the storage device of the parity DASD 1105.

Hence, the each data block is written to the corresponding DASD drives 1102–1104, the corresponding parity bits are updated by a daisy chain XOR computation of the DASDs 1102–1104, and the updated parity bits are stored by the parity DASD 1105.

OTHER COMPREHENSIVE MASTER OPERATIONS

In addition to the comprehensive master operations discussed above, the command set described herein may be employed, along with the data storage system of the invention, to perform a variety of other operations. Moreover, new commands and adaptations of the commands described herein may be implemented in a data storage system, within the scope of the present invention. Such operations and commands are within the abilities of an ordinarily skilled artisan, having the benefit of this disclosure. Also, while there have been shown what are presently considered to be preferred embodiments of the invention, it will be apparent to those skilled in the art that various changes and modifications can be made herein without departing from the scope of the invention as defined by the appended claims.

What is claimed is:

1. A data storage system configured to perform a task that requires performance of multiple XOR operations, said data storage system comprising:

a controller to transmit commands;

an array of DASDs, responsive to the commands to carry out the task while distributing performance of the XOR operations among the DASDs by operating the DASDs to sequentially transmit data among the DASDs in a selected order, wherein multiple ones of the DASDs perform XOR operations on the data prior to transmitting the data to another DASD in the selected order; and a bus interconnecting the DASDs and the controller.

2. A method of operating a data storage system that includes:

multiple members including a controller and a string of multiple DASDs; and a bus electrically interconnecting the members;

each DASD comprising:
  an interface electrically connected to the bus;
  a data storage device;
  a buffer operably connected to the interface and the storage device; and
  a processor operably connected to the buffer; said method comprising the steps of:

identifying operable ones of the DASDs;

transmitting commands from the controller individually to the identified DASDs; and operating the identified DASDs, in response to the commands, to conduct a daisy-chain transfer of data through the identified DASDs in a predetermined order, wherein data is sequentially transferred and received by each DASD beginning with an initiator DASD and continuing through multiple intermediate DASDs to a receiver DASD, wherein each intermediate DASD, prior to transferring data received along the daisy chain to a next DASD in the predetermined order, additionally performs an XOR operation upon the received item of data and another item of data.

3. The method of claim 2, wherein said another item of data comprises an item of data received from the controller.

4. The method of claim 2, wherein said another item of data comprises an item of data read from the intermediate DASDs' respective storage device.

5. The method of claim 2, further including a step of operating a selected one of the DASDs, in response to at least one predetermined command from the controller, to read data from the selected DASD's storage device and transmit the read data to a selected one of the members.

6. The method of claim 2, further including a step of operating a selected one of the DASDs, in response to at least one predetermined command from the controller, to write data received at the interface to the selected DASD's storage device.

7. The method of claim 2, wherein the operating step includes a step of operating a selected one of the DASDs, in response to at least one predetermined command from the controller, to read selected data from the selected DASD's storage device, perform an XOR operation upon data received by the selected DASD's interface and the selected data, and transfer results of the XOR operation to a selected one of the members.

8. The method of claim 2, wherein the operating step includes a step of operating a selected one of the DASDs, in response to at least one predetermined command from the controller, to read selected data from the selected DASD's storage device, perform an XOR operation upon data received by the selected DASD's interface and the selected data, transfer results of the XOR operation to a selected one of the members, and write the data received at the selected DASD's interface to the selected DASD's storage device.

9. The method of claim 2, wherein the operating step includes a step of operating a selected one of the DASDs, in response to at least one predetermined command from the controller, to read selected data from the selected DASD's storage device, perform an XOR operation upon data received by the selected DASD's interface and the selected data, and write results of the XOR operation to the selected DASD's storage device.

10. The method of claim 2, wherein the operating step includes a step of operating a selected one of the DASDs, in response to at least one predetermined command from the controller, to write data received at the selected DASD's interface to the selected DASD's storage device, and transmit the received data to a selected one of the members.

11. The method of claim 2, wherein the operating step includes a step of operating a selected one of the DASDs, in response to at least one predetermined command from the controller, to perform an XOR operation on two items of data received by the selected DASD's interface, transmit results of the XOR operation to a selected one of the members, and write a selected one of the received data items to the selected DASD's storage device.

12. In a data storage system that includes a controller, an array of DASDs, and a bus interconnecting the DASDs and the controller, a method of operating the data storage system to perform a task that requires performance of multiple XOR operations, said method comprising the steps of:
 transmitting commands from the controller to the DASDs via the bus; and
 in response to the commands, operating the DASDs to perform the task, wherein performance of the XOR operations is distributed among the DASDs;
 wherein the operating step comprises the steps of operating the DASDs to sequentially transmit data among the DASDs in a selected order, wherein multiple ones of the DASDs perform XOR operations on the data prior to transmitting the data to another DASD in the selected order.

13. In a data storage system that includes a controller, an array of DASDs, and a bus interconnecting the DASDs and the controller, a method of operating the data storage system to perform a task that requires performance of multiple XOR operations, said method comprising the steps of:
 transmitting commands from the controller to the DASDs via the bus; and
 in response to the commands, operating the DASDs to perform the task, wherein performance of the XOR operations is distributed among the DASDs;
 wherein the operating step comprises a regenerate operation, comprising the steps of:
  operating a first one of the DASDs to read a first data block from a first storage location therein and transmit the first data block to a second one of the DASDs;
  operating the second DASD to perform steps comprising:
   receiving the first data block from the first DASD;
   reading from a storage location in the second DASD a second data block corresponding to the first data block;
   performing an XOR operation on the first and second data blocks to yield a first XOR result; and
   transmitting the first XOR result to a third one of the DASDs; and
  operating the third DASD to perform steps comprising:
   receiving the first XOR result from the second DASD;
   reading from a storage location in the third DASD a third data block corresponding to the first and second data blocks;
   performing an XOR operation on the first XOR result and the second data block to yield a second XOR result; and
   transmitting the second XOR result to the controller.

14. In a data storage system that includes a controller, an array of DASDs, and a bus interconnecting the DASDs and the controller, a method of operating the data storage system to perform a task that requires performance of multiple XOR operations, said method comprising the steps of:
 transmitting commands from the controller to the DASDs via the bus; and
 in response to the commands, operating the DASDs to perform the task, wherein performance of the XOR operations is distributed among the DASDs;
 wherein the operating step comprises a rebuild operation, comprising the steps of:
  operating a first one of the DASDs to read a first data block from a first storage location therein;
  operating a second one of the DASDs to perform steps comprising:
   receiving the first data block from the first DASD;
   reading from a storage location in the second DASD a second data block corresponding to the first data block;
   performing an XOR operation on the second data block and the first data block to yield a first XOR result; and
   transmitting the first XOR result to a third one of the DASDs;
  operating the third DASD to perform steps comprising:
   receiving the first XOR result from the second DASD;
   reading from a storage location in the third DASD a third data block corresponding to the first and second data blocks;
   performing an XOR operation on the first XOR result and the third data block to yield a second XOR result; and
   transmitting the second XOR result to a fourth one of the DASDs; and
  operating the fourth DASD to perform steps comprising:
   receiving the second XOR result from the third DASD; and
   writing the second XOR result to a storage location in the fourth DASD.

15. In a data storage system that includes a controller, an array of DASDs, and a bus interconnecting the DASDs and the controller, a method of operating the data storage system to perform a task that requires performance of multiple XOR operations, said method comprising the steps of:
 transmitting commands from the controller to the DASDs via the bus; and
 in response to the commands, operating the DASDs to perform the task, wherein performance of the XOR operations is distributed among the DASDs;
 wherein the operating step comprises an update operation, comprising the steps of:
  transmitting a first data block from the controller to a first storage location of a first one of the DASDs;
  operating the first DASD to perform steps comprising:
   receiving the first data block from the controller;
   reading from a storage location in the first DASD a second data block corresponding to the first data block;

performing an XOR operation on the first and second data blocks to yield a first XOR result; and transmitting the first XOR result to a second one of the DASDs;

operating the second DASD to perform steps comprising:
  receiving the first XOR result from the first DASD;
  reading from a storage location in the second DASD a third data block corresponding to the first and second data blocks;
  performing an XOR operation on the third data block and the second data block to yield a second XOR result;
  transmitting the second XOR result to a third one of the DASDs; and operating the third DASD to perform steps comprising:
  receiving the second XOR result from the second DASD; and
  writing the second XOR result to a storage location in the third DASD device.

16. In a data storage system that includes a controller, an array of DASDs, and a bus interconnecting the DASDs and the controller, a method of operating the data storage system to perform a task that requires performance of multiple XOR operations, said method comprising the steps of:

transmitting commands from the controller to the DASDs via the bus; and in response to the commands, operating the DASDs to perform the task, wherein performance of the XOR operations is distributed among the DASDs;

wherein the operating step comprises a write-stripe operation, comprising the steps of:
  transmitting a first data block from the controller to a first storage location of a first one of the DASDs;
  operating the first DASD to perform steps comprising:
    receiving the first data block from the controller;
    writing the first data block to a storage location in the first DASD;
    transmitting the first data block to a second one of the DASDs;
  operating the second DASD to perform steps comprising:
    receiving a second data block from the controller;
    writing the second data block to a storage location in the second DASD;
    receiving the first data block from the first DASD;
    performing an XOR operation on the first and second data blocks to yield a first XOR result;
    transmitting the first XOR result to a third one of the DASDs; and
  operating the third DASD to perform steps comprising:
    receiving a third data block from the controller;
    writing the third data block to a storage location in the third DASD;
    receiving the first XOR result from the second DASD;
    performing an XOR operation on the first XOR result and the third data block to yield a second XOR result;
    transmitting the second XOR result to a fourth one of the DASDs; and
  operating the fourth DASD to perform steps comprising:
    receiving the second XOR result from the third DASD; and
    writing the second XOR result to a storage location in the fourth DASD.

17. A data storage system for performing a task that requires performance of multiple XOR operations, said system comprising:

a bus;

a controller, electrically connected to the bus, the controller being programmed to transmit commands onto the bus; and an array of DASDs, electrically connected to the bus, the DASDs being programmed to receive the transmitted commands and in response thereto to sequentially transmit data among the DASDs in a selected order, wherein multiple ones of the DASDs perform XOR operations on the data prior to transmitting the data to another DASD in the selected order.

* * * * *